US011059605B2

(12) United States Patent
Ishida et al.

(10) Patent No.: US 11,059,605 B2
(45) Date of Patent: Jul. 13, 2021

(54) COMPONENT MANUFACTURING METHOD AND COMPONENT MANUFACTURING SYSTEM

(71) Applicant: MITSUBISHI HEAVY INDUSTRIES, LTD., Tokyo (JP)

(72) Inventors: Makoto Ishida, Tokyo (JP); Yuji Ito, Tokyo (JP); Kanau Yamauchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 103 days.

(21) Appl. No.: 16/348,648

(22) PCT Filed: Oct. 16, 2017

(86) PCT No.: PCT/JP2017/037379
§ 371 (c)(1),
(2) Date: May 9, 2019

(87) PCT Pub. No.: WO2018/088138
PCT Pub. Date: May 17, 2018

(65) Prior Publication Data
US 2019/0263539 A1   Aug. 29, 2019

(30) Foreign Application Priority Data
Nov. 11, 2016   (JP) .............................. JP2016-220429

(51) Int. Cl.
  *B64F 5/10*   (2017.01)
  *B64C 1/06*   (2006.01)
  (Continued)

(52) U.S. Cl.
  CPC ................ *B64F 5/10* (2017.01); *B23P 19/00* (2013.01); *B23P 21/00* (2013.01); *B25J 13/08* (2013.01);
  (Continued)

(58) Field of Classification Search
  CPC ... B64F 5/10; B64C 1/06; B64C 1/068; B23P 21/00; B23P 19/00; F16B 5/0032;
  (Continued)

(56) References Cited

U.S. PATENT DOCUMENTS 6,003,812 A   12/1999   Micale et al.
6,148,494 A   11/2000   Bauer et al.
  (Continued)

FOREIGN PATENT DOCUMENTS

CN   102294589 A   12/2011
CN   105300339 A   2/2016
  (Continued)

OTHER PUBLICATIONS

Nirosh Jayaweera et al., "Adaptive robotic assembly of compliant aero-structure components", Robotics and Computer-Integrated Manufacturing, vol. 23, Issue 2, pp. 180-194 (15 pages).
  (Continued)

*Primary Examiner* — John C Hong
(74) *Attorney, Agent, or Firm* — Osha Bergman Watanabe & Burton LLP

(57) ABSTRACT

A component manufacturing method includes a step of calculating, for a plurality of keyholes formed on a skin and disposed in a row along a first axial direction on the skin, a first imaginary line that passes an average position in a second axial direction perpendicular to the first axial direction and is parallel to the first axial direction, a step of calculating, for a plurality of keyholes formed on a frame and disposed in a row along a third axial direction on the frame, a second imaginary line that passes an average position in a fourth axial direction perpendicular to the third axial direction and is parallel to the third axial direction, and a step of superimposing the skin and the frame such that the first imaginary line and the second imaginary line coincide.

4 Claims, 5 Drawing Sheets

(51) Int. Cl.
  *F16B 21/12* (2006.01)
  *F16B 5/00* (2006.01)
  *B25J 13/08* (2006.01)
  *B23P 21/00* (2006.01)
  *B23P 19/00* (2006.01)
  *F16B 13/10* (2006.01)
  *F16B 21/14* (2006.01)

(52) U.S. Cl.
  CPC ............... *B64C 1/06* (2013.01); *B64C 1/068* (2013.01); *F16B 5/0032* (2013.01); *F16B 21/12* (2013.01); *F16B 2013/10* (2013.01); *F16B 2021/14* (2013.01)

(58) Field of Classification Search
  CPC .. F16B 2021/14; F16B 21/12; F16B 2013/10; B25J 9/1687; B25J 13/08; G05B 2219/40033; G05B 2219/49113; G05B 19/402
  See application file for complete search history.

(56) References Cited

U.S. PATENT DOCUMENTS

| | | | |
|---|---|---|---|
| 6,314,630 B1 | 11/2001 | Munk et al. | |
| 7,823,362 B2* | 11/2010 | Meyer | B64C 1/069 52/713 |
| 8,061,035 B2* | 11/2011 | Stulc | B64C 1/068 29/897.2 |
| 8,496,202 B2* | 7/2013 | Marche | B64D 27/12 244/54 |
| 2002/0078545 A1 | 6/2002 | Munk et al. | |
| 2010/0193605 A1 | 8/2010 | Johnson et al. | |
| 2011/0001010 A1 | 1/2011 | Tacke et al. | |
| 2011/0282483 A1 | 11/2011 | Simonetti et al. | |
| 2015/0139752 A1 | 5/2015 | Torres | |
| 2015/0276640 A1 | 10/2015 | Spath | |
| 2015/0356236 A1 | 12/2015 | Bense et al. | |
| 2017/0369186 A1 | 12/2017 | Goto et al. | |
| 2019/0276164 A1* | 9/2019 | Ishida | B23P 21/002 |
| 2019/0287902 A1* | 9/2019 | Liaw | H01L 21/76895 |

FOREIGN PATENT DOCUMENTS

| | | |
|---|---|---|
| EP | 0593127 A1 | 4/1994 |
| JP | 2000-506816 A | 6/2000 |
| JP | 2011-502871 A | 1/2011 |
| JP | 2012-516410 A | 7/2012 |
| JP | 2014-188697 A | 10/2014 |
| JP | 2016-137839 A | 8/2016 |

OTHER PUBLICATIONS

Patrick D. Hammett et al., "Quantifying Alignment Effects in 3D Coordinate Measurement", University of Michigan Transportation Research Institute [retrieved from the Internet: URL: http://www.mvsgroup.com/wp-content/uploads/2012/02/Alignment-UMTRI-2009-Oct301.pdf] (43 pages).

Fritz Scholz, "Hole Alignment Tolerance Stacking Issues", Technical Document Series, Phantom Works, Mathematics & Computing Technology, A Division of the Boeing Company [retrieved from the Internet: URL: http://faculty.washington.edu/fscholz/Reports/holematch.pdf] (117 pages).

International Search Report with English Translation in corresponding International Application No. PCT/JP2017/037379, dated Dec. 19, 2017 (5 pages).

Written Opinion in corresponding International Application No. PCT/JP2017/037379, dated Dec. 19, 2017 (3 pages).

First Office Action in corresponding Chinese Application No. 201780068989.1, dated Aug. 18, 2020 (19 pages).

* cited by examiner

COMPONENT MANUFACTURING METHOD AND COMPONENT MANUFACTURING SYSTEM

TECHNICAL FIELD

The present invention relates to a component manufacturing method and a component manufacturing system and, more particularly, to a component manufacturing method and a component manufacturing system for manufacturing an aircraft component produced by combining a skin, which is a tabular member, and a frame or a stringer, which is a long member.

BACKGROUND ART

An aircraft component such as a body is produced by, for example, fastening a stringer or a frame to a tabular member (a skin) with rivets and integrating the stringer or the frame and the tabular member. Conventionally, for assembly of these members, in a state in which the skin is fixed to a table-like jig, the frame or the stringer positioned by another positioning jig are superimposed and thereafter the frame or the stringer is temporarily tacked to the skin by rivets for temporary tacking. After the temporary tacking is completed and an inspection is finished, predetermined rivet fastening positions are riveted. Consequently, an aircraft component obtained by integrating the skin, the frame, and the stringer is produced.

The body of the aircraft has a circular shape in a cross section. The diameter of the circular shape changes along a machine axis direction. Therefore, there are large numbers of kinds of the skin, the frame, and the stringer. For that reason, large numbers of kinds of the table-like jig for fixing the skin and the positioning jig for the frame or the stringer also need to be prepared in advance. Therefore, as opposed to the method of producing the aircraft component using the jig, there is a method of performing positioning of members such as the skin, the frame, and the stringer using a robot and riveting and integrating, using rivets, the members positioned by the robot. Consequently, it is possible to produce the aircraft component without preparing a large number of kinds of jigs. It is possible to reduce storage places of the jigs and reduce labor and time for replacement of the jigs while reducing time and cost for production preparation for the aircraft component.

PTL 1 described below discloses a technique for, in order to dispose beams on wing panels, mounting the beams on the wing panels using alignment holes and further mounting an inter-beam rib on a rib post on the beams using alignment holes present at an end portion of a rib and the rib post.

CITATION LIST

Patent Literature

[PTL 1]
Japanese Translation of PCT International Application, Publication No. 2000-506816

SUMMARY OF INVENTION

Technical Problem

The inventors of this application examined, in the method of performing the positioning of the members such as the skin, the frame, and the stringer using the robot, a method of superimposing, in a predetermined position, a stringer, which is a tabular member, and a frame or a skin, which is a long member long in one direction. In automation by the robot, it is possible to cause the robot to perform the same operation for the same member. For that purpose, the operation of the robot is defined by teaching or the like beforehand. However, actually, since manufacturing errors occur in the members, in order to reduce assembly errors that occur when a plurality of members are integrated to assemble a component, it is necessary to perform calibration on the operation of the robot defined in advance.

The present invention has been devised in view of such circumstances, and an object of the present invention is to provide a component manufacturing method and a component manufacturing system capable of, when two members are superimposed and assembled, accurately aligning the two members.

Solution to Problem

A component manufacturing method according to a first aspect of the present invention includes: a first step of calculating, for a plurality of first positioning holes formed on a first member and disposed in a row along a first axial direction on the first member, a first imaginary line that passes an average position in a second axial direction perpendicular to the first axial direction and is parallel to the first axial direction; a second step of calculating, for a plurality of second positioning holes formed on a second member different from the first member and disposed in a row along a third axial direction on the second member, a second imaginary line that passes an average position in a fourth axial direction perpendicular to the third axial direction and is parallel to the third axial direction; and a third step of superimposing the first member and the second member such that the first imaginary line and the second imaginary line coincide.

With this configuration, the first imaginary line passing the average position in the second axial direction perpendicular to the first axial direction is calculated concerning the plurality of first positioning holes disposed in a row along the first axial direction on the first member. The second imaginary line passing the average position in the fourth axial direction perpendicular to the third axial direction is calculated concerning the plurality of second positioning holes disposed in a row along the third axial direction on the second member. The first member and the second member are superimposed such that the first imaginary line and the second imaginary line coincide. Consequently, it is possible to superimpose the first member and the second member in a state in which positional deviation between the first positioning holes and the second positioning holes is the smallest.

In the first aspect, the first step may include: a step of detecting positions of the plurality of first positioning holes; a step of calculating, based on the detected positions of the plurality of first positioning holes, the average position in the second axial direction of the plurality of first positioning holes; and a step of calculating the first imaginary line passing the average position of the first positioning holes. The second step may include: a step of detecting positions of the plurality of second positioning holes; a step of calculating, based on the detected positions of the plurality of second positioning holes, the average position in the fourth axial direction of the plurality of second positioning holes; and a step of calculating the second imaginary line passing the average position of the second positioning holes.

With this configuration, the average position in the second axial direction perpendicular to the first axial direction is calculated concerning the plurality of first positioning holes disposed in a row along the first axial direction on the first member. The average position in the fourth axial direction perpendicular to the third axial direction is calculated concerning the plurality of second positioning holes disposed in a row along the third axial direction on the second member. The first imaginary line concerning the first positioning holes and the second imaginary line concerning the second positioning holes passing these average positions are calculated. Thereafter, the first member and the second member are superimposed such that the first imaginary line and the second imaginary line coincide. Consequently, it is possible to superimpose the first member and the second member in a state in which positional deviation between the first positioning holes and the second positioning holes is the smallest.

A component manufacturing system according to a second aspect of the present invention includes a robot for attachment that attaches a second member to a first member. The robot for attachment includes a control unit that controls the robot for attachment. The control unit includes: an imaginary-line calculating unit that calculates, for a plurality of first positioning holes formed on the first member and disposed in a row along a first axial direction on the first member, a first imaginary line that passes an average position in a second axial direction perpendicular to the first axial direction and is parallel to the first axial direction and calculates, for a plurality of second positioning holes formed on a second member different from the first member and disposed in a row along a third axial direction on the second member, a second imaginary line that passes an average position in a fourth axial direction perpendicular to the third axial direction and is parallel to the third axial direction; and a driving control unit that drives the robot for attachment and superimposes the first member and the second member such that the first imaginary line and the second imaginary line coincide.

In the second aspect, the component manufacturing system may include a robot for detection that detects positions of the plurality of first positioning holes and detects positions of the plurality of second positioning holes. The control unit of the robot for attachment may further include an average calculating unit that calculates, based on the detected positions of the plurality of first positioning holes, the average position in the second axial direction of the plurality of first positioning holes and calculates, based on the detected positions of the plurality of second positioning holes, the average position in the fourth axial direction of the plurality of second positioning holes.

Advantageous Effects of Invention

According to the present invention, when two members are superimposed and assembled, it is possible to accurately align a first member and a second member in a state in which positional deviation between first positioning holes on the first member and second positioning holes on the second member is the smallest.

DESCRIPTION OF EMBODIMENTS

An embodiment of the present invention is explained below with reference to the drawings.

When a plurality of members are superimposed, an aircraft component manufacturing system 1 according to an embodiment of the present invention can accurately superimpose the plurality of members in aligning the members based on pluralities of keyholes formed on the respective members. The aircraft component is, for example, a body, a main wing, or the like of an aircraft. In the following explanation, when the body of the aircraft is manufactured, the case of combining a skin, which is a tabular member, and a frame or a stringer, which is a long member, will be described. The keyholes are an example of positioning holes and are through-holes formed to pierce through the members. The keyholes can be used for positioning during member attachment. Rivets for temporary tacking can be inserted through the keyholes.

The skin has an arcuate shape in a cross section cut perpendicularly to a machine axis direction of the aircraft. The frame is a member disposed along the circumference of the skin. The frame has an arcuate shape and has a curvature. The stringer is a member disposed in parallel to the machine axis direction of the aircraft with respect to the skin and is a linear member. The frame or the stringer is attached to the skin, whereby the aircraft component such as the body is produced. At this time, positioning during attachment of the frame or the stringer to the skin can be performed based on keyholes formed on the skin and keyholes formed on the frame or the stringer. The skin and the frame or the stringer can be integrated by inserting rivets for temporary tacking through the keyholes formed on the skin and the keyholes formed on the frame or the stringer and fastening the rivets for temporary tacking to the keyholes.

Figure 1:
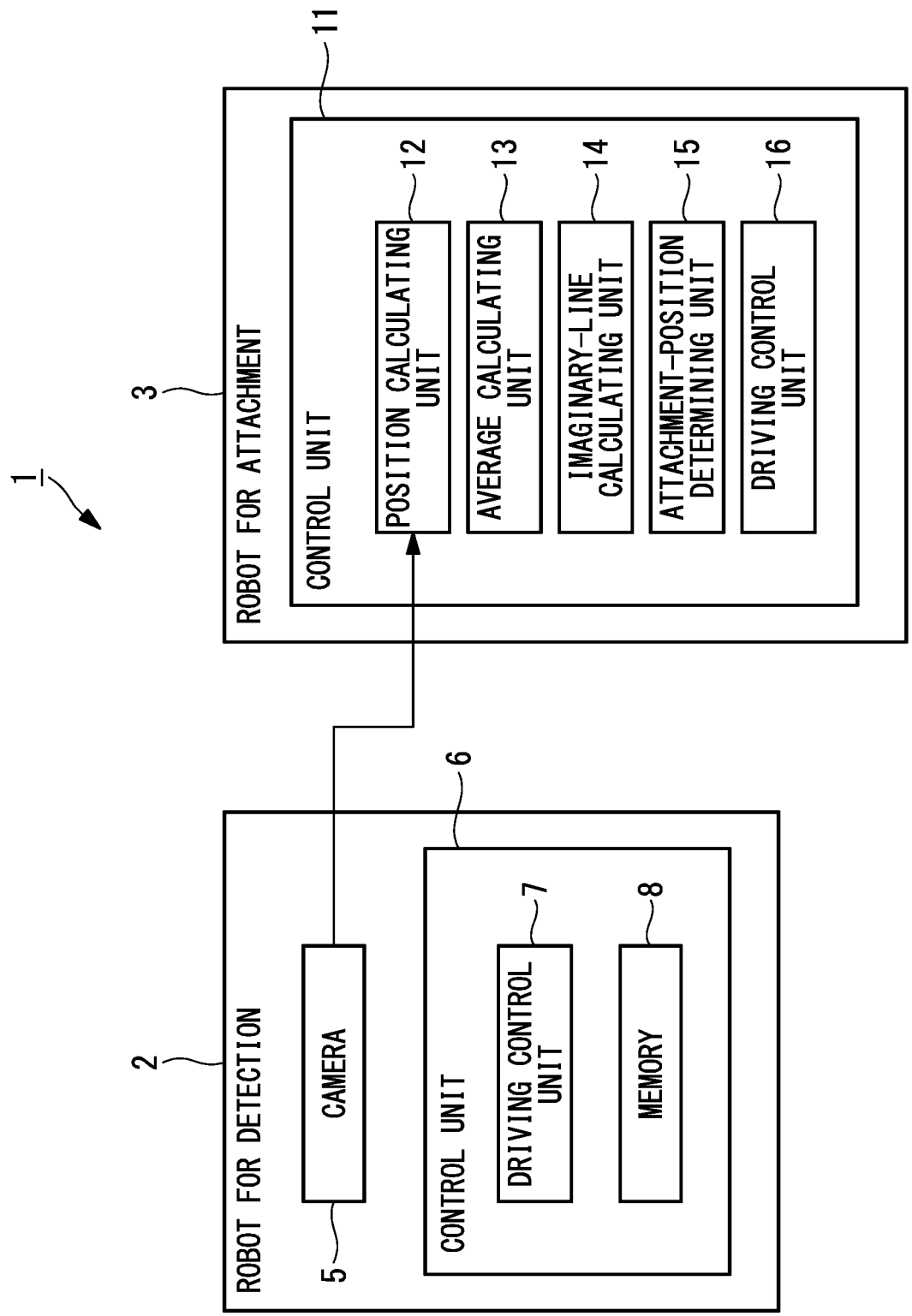
FIG. 1 is a block diagram showing an aircraft component manufacturing system according to an embodiment of the present invention.

The aircraft component manufacturing system 1 includes, as shown in FIG. 1, a robot for detection 2 that detects keyholes 60 formed on members and a robot for attachment 3 that attaches another member to one member.

Figure 2:
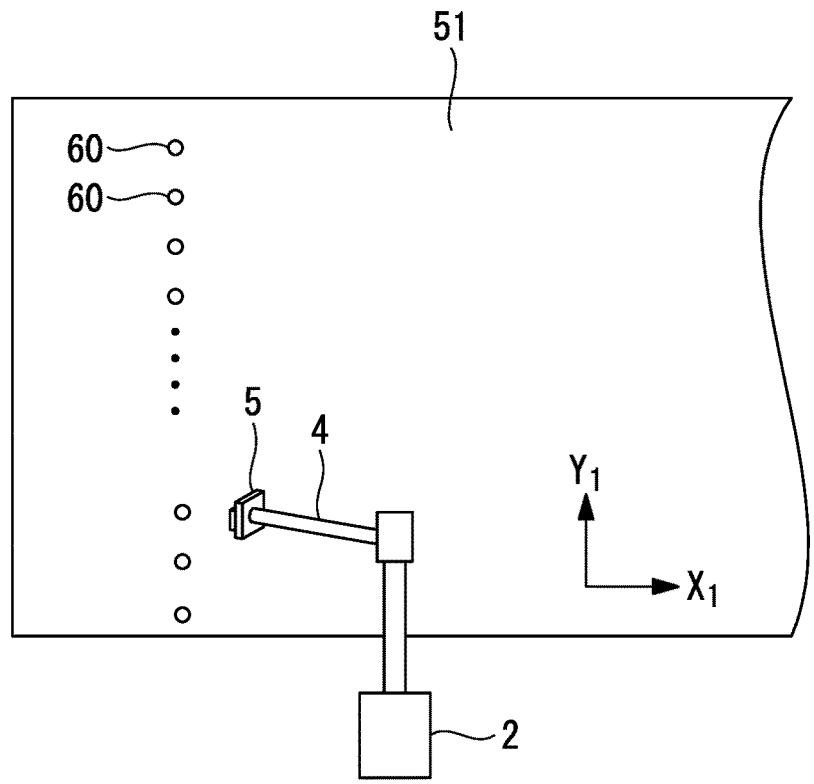
FIG. 2 is a schematic diagram showing a robot for detection and a skin of the aircraft component manufacturing system according to the embodiment of the present invention.
Figure 3:
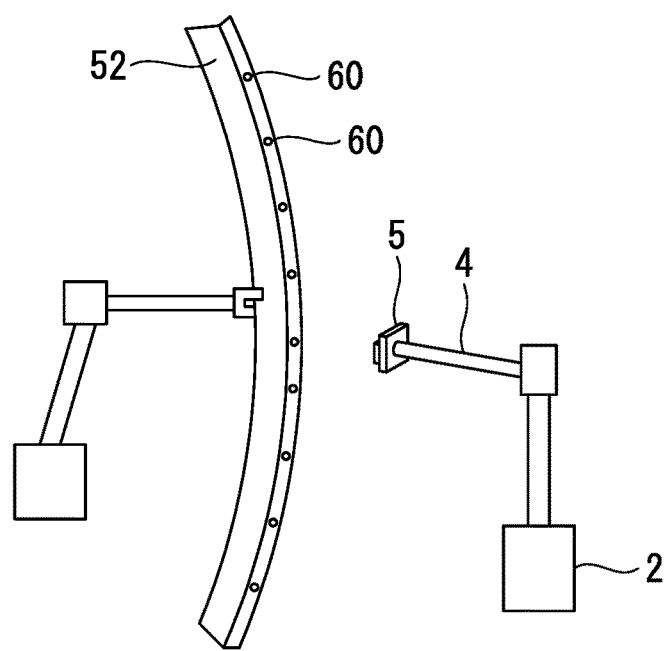
FIG. 3 is a schematic diagram showing the robot for detection and a frame of the aircraft component manufacturing system according to the embodiment of the present invention.

As shown in FIG. 2 and FIG. 3, the robot for detection 2 includes an arm 4. A camera 5 is attached to the arm 4. The robot for detection 2 is controlled by a control unit 6. The operation of the control unit 6 is realized by a hardware resource such as a CPU executing a program recorded in advance.

The control unit 6 of the robot for detection 2 includes, as shown in FIG. 1, a driving control unit 7 and a memory 8.

The driving control unit 7 drives the arm 4 of the robot for detection 2 based on data concerning positions of the keyholes 60 formed on a member (a skin 51, a frame 52, or a stringer 53) recorded in the memory 8 and moves the camera 5 attached to the arm 4 to near the keyholes 60. The camera 5 images the keyholes 60 formed on the skin 51, the frame 52, or the stringer 53. The driving control unit 7 drives the arm 4 of the robot for detection 2 and, when the imaging of one keyhole 60 is finished, moves the camera 5 to the next keyhole 60 and performs imaging of the keyhole 60 to which the camera 5 is moved. The driving control unit 7 repeats this to image a plurality of keyholes 60 formed on the skin 51, the frame 52, or the stringer 53.

Imaging data acquired by the camera 5 is transmitted to a control unit 11 of the robot for attachment 3.

Figure 4:
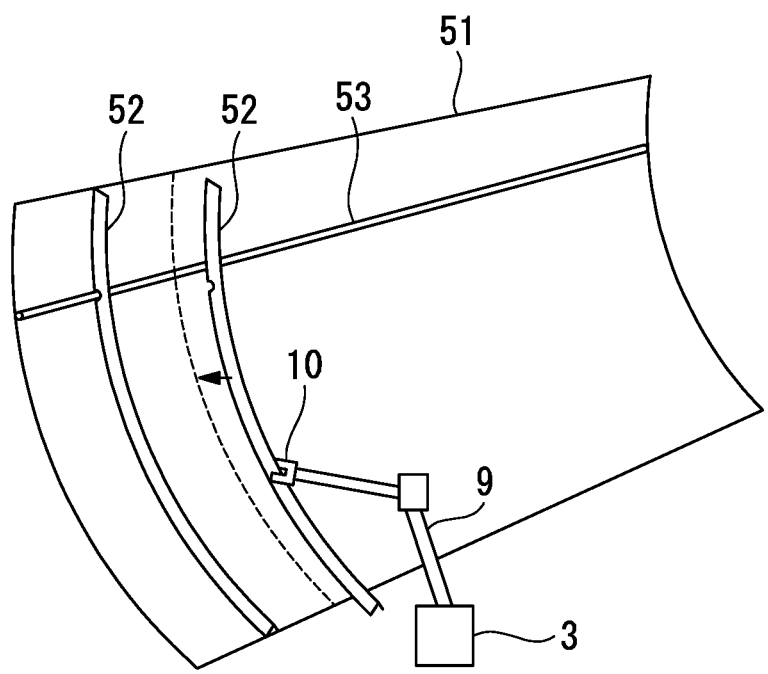
FIG. 4 is a schematic diagram showing a robot for attachment, the skin, the frame, and a stringer of the aircraft component manufacturing system according to the embodiment of the present invention.

As shown in FIG. 4, the robot for attachment 3 includes an arm 9. A gripping unit (a hand) 10 that grips a member is attached to the distal end of the arm 9. The robot for attachment 3 is controlled by the control unit 11. The operation of the control unit 11 is realized by a hardware resource such as a CPU executing a program recorded in advance.

The control unit 11 of the robot for attachment 3 includes, as shown in FIG. 1, a position calculating unit 12, an average calculating unit 13, an imaginary-line calculating unit 14, an attachment-position determining unit 15, and a driving control unit 16.

The position calculating unit 12 receives imaging data from the camera 5. The position calculating unit 12 calculates position coordinates of the keyholes 60 based on an imaging result of the keyholes 60 by the camera 5. The position coordinates of the keyholes 60 are calculated concerning both of the keyholes 60 formed on the skin 51 and the keyholes 60 formed on the frame 52 or the stringer 53.

The average calculating unit 13 calculates, for a plurality of keyholes 60 disposed in a row along a Y-axis direction, an average position in an X-axis direction perpendicular to the Y-axis direction based on position coordinates of the plurality of keyholes 60. The average position in the X-axis direction concerning the plurality of keyholes 60 is calculated concerning both of the keyholes 60 formed on the skin 51 and the keyholes 60 formed on the frame 52 or the stringer 53.

Figure 6:
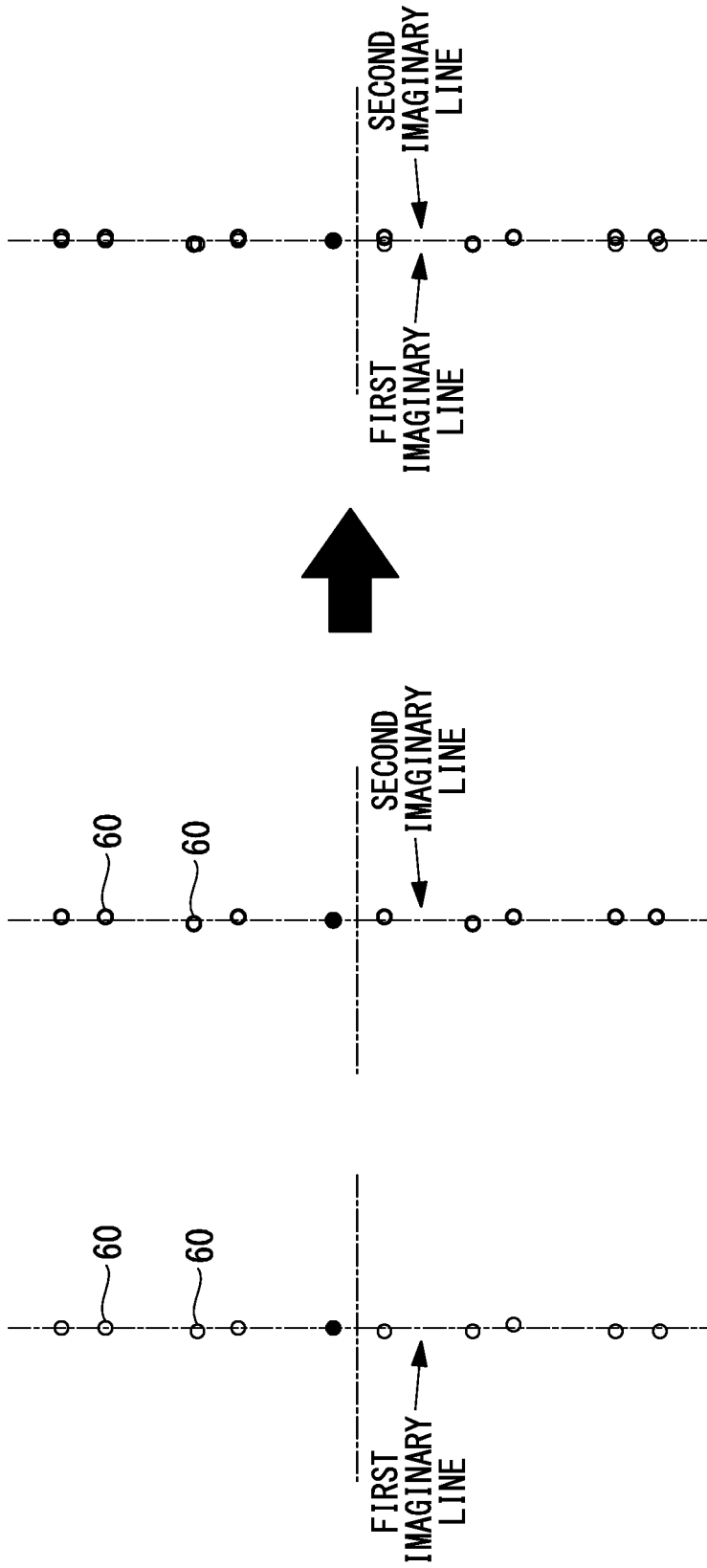
FIG. 6 is a schematic diagram showing keyholes and a first imaginary line on the skin and keyholes and a second imaginary line on the frame or the stringer.

The imaginary-line calculating unit 14 calculates an imaginary line that passes the average position of the plurality of keyholes 60 calculated by the average calculating unit 13 and is parallel to the Y-axis direction as shown in FIG. 6. The imaginary line is calculated concerning both of the keyholes 60 formed on the skin 51 and the keyholes 60 formed on the frame 52 or the stringer 53. The imaginary line concerning the keyholes 60 formed on the skin 51 is calculated as a first imaginary line. The imaginary line concerning the keyholes 60 formed on the frame 52 or the stringer 53 is calculated as a second imaginary line.

The attachment-position determining unit 15 determines a position where the skin 51 and the frame 52 or the stringer 53 are attached such that the first imaginary line and the second imaginary line calculated by the imaginary-line calculating unit 14 overlap as shown in FIG. 6. The attachment position determined by the attachment-position determining unit 15 is calculated as coordinate data. The attachment position determined by the attachment-position determining unit 15 is based on the first imaginary line passing the average position in the X-axis direction of the keyholes 60 formed on the skin 51 and the second imaginary line passing the average position in the X-axis direction of the keyholes 60 formed on the frame 52 or the stringer 53. Therefore, when the frame 52 or the stringer 53 is superimposed on the skin 51, it is possible to minimize the influence of positional deviation due to manufacturing errors of the keyholes 60.

The driving control unit 16 drives the arm 9 of the robot for attachment 3 based on data concerning the attachment position determined by the attachment-position determining unit 15 and moves the frame 52 or the stringer 53 to the determined attachment position. As a result, the frame 52 or the stringer 53 is superimposed on the skin 51 by the robot for attachment 3.

Figure 7:
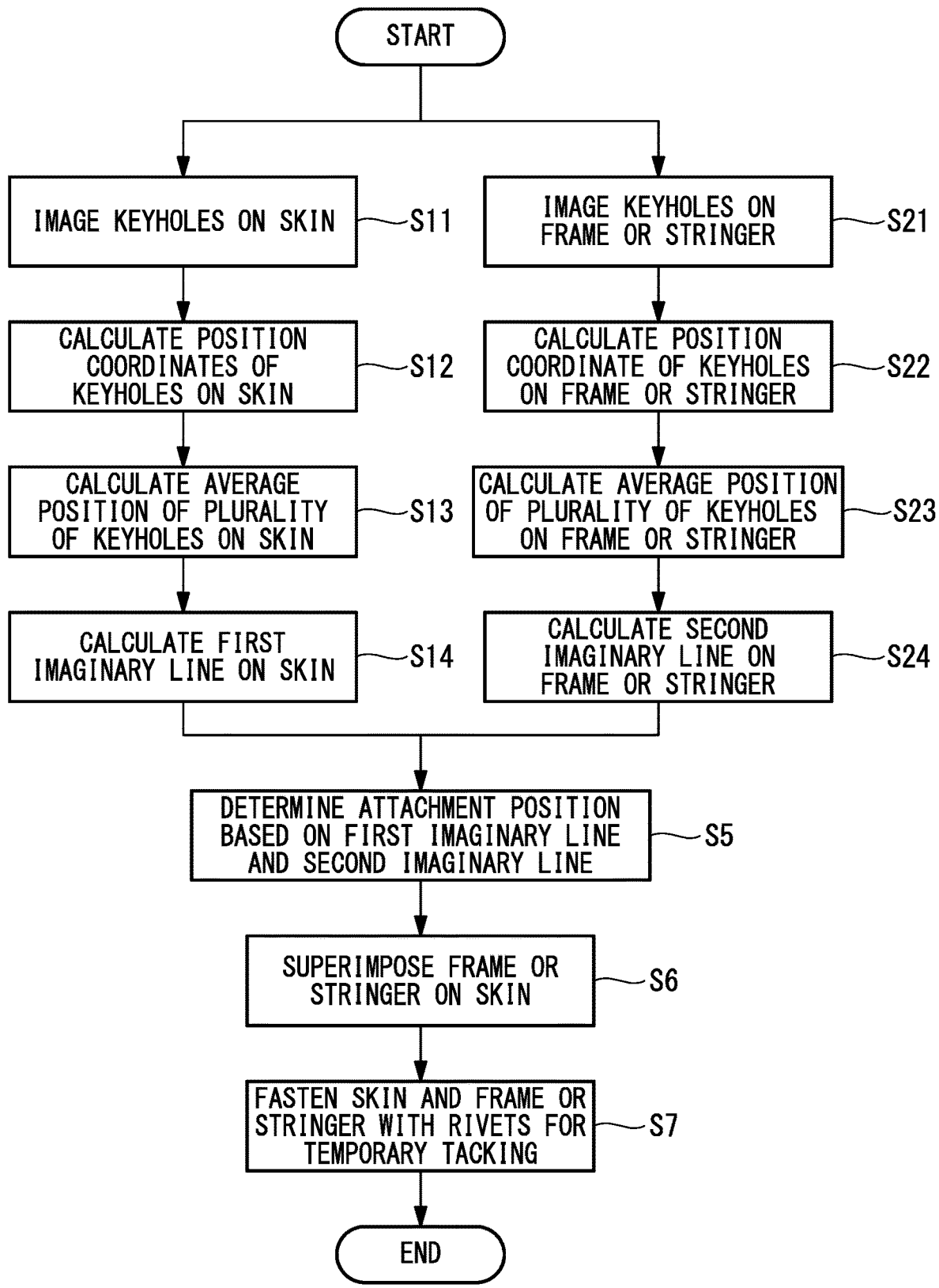
FIG. 7 is a flowchart showing a method of manufacturing an aircraft component using the aircraft component manufacturing system according to the embodiment of the present invention.

A method of manufacturing an aircraft component using the aircraft component manufacturing system 1 according to this embodiment is explained with reference to FIG. 7.

First, as shown in FIG. 2, the robot for detection 2 images the positions of the keyholes 60 formed on the skin 51 using the camera 5 (step S11). The plurality of keyholes 60 are disposed in a row. The keyholes 60 adjacent to each other are disposed at an interval. Therefore, the robot for detection 2 desirably images the keyholes 60 one by one. Note that the present invention is not limited to this example. The robot for detection 2 may simultaneously image two or more keyholes 60.

Concerning the frame 52 or the stringer 53 superimposed on the skin 51, as shown in FIG. 3, the robot for detection 2 images the positions of the keyholes 60 formed on the frame 52 or the stringer 53 (step S21). In this case, the robot for detection 2 may image the keyholes 60 one by one or may simultaneously image two or more keyholes 60.

When imaging the keyholes 60, the robot for detection 2 acquires data (e.g., data taught by teaching or CAD data of the members) concerning the positions of the keyholes 60. The robot for detection 2 moves to positions corresponding to the keyholes 60 on the members, that is, actual positions near the keyholes 60 based on the acquired data.

Subsequently, the control unit 11 of the robot for attachment 3 calculates position coordinates of the keyholes 60 based on an imaging result of the keyholes 60 by the camera 5 (steps S12 and S22). The position coordinates of the keyholes 60 formed on the skin 51 include an $x_1$ coordinate and a $y_1$ coordinate when an axial direction parallel to a longitudinal direction of the long frame 52 or stringer 53 disposed on the skin 51 is represented as a $Y_1$ axial direction and an axial direction perpendicular to the $Y_1$ axial direction is represented as an $X_1$ axial direction (see FIG. 2). The frame 52 is disposed such that the longitudinal direction is a direction perpendicular to a machine axis direction. Therefore, during the attachment of the skin 51 and the frame 52, the $Y_1$ axial direction is a direction perpendicular to the machine axis direction. On the other hand, the stringer 53 is disposed such that the longitudinal direction is a direction parallel to the machine axis direction. Therefore, during the attachment of the skin 51 and the stringer 53, the $Y_1$ axial direction is a direction parallel to the machine axis direction. The plurality of keyholes 60 on the skin 51 are disposed in a row along the $Y_1$ axial direction determined according to the longitudinal direction of the frame 52 or the stringer 53 attached to the skin 51.

Figure 5:
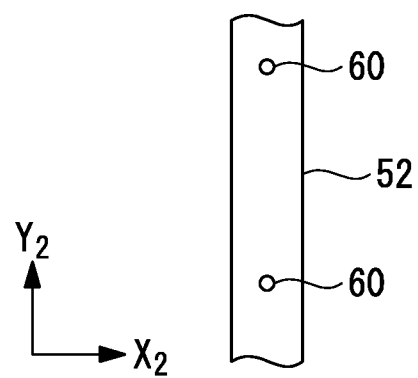
FIG. 5 is a front view showing the frame and keyholes.

As shown in FIG. 5, the position coordinates of the keyholes 60 formed on one frame 52 or stringer 53 include an $x_2$ coordinate and a $y_2$ coordinate when an axial direction parallel to the longitudinal direction of the long frame 52 or stringer 53 is represented as a $Y_2$ axial direction and an axial direction perpendicular to the $Y_2$ axial direction is represented as an $X_2$ axial direction. The plurality of keyholes 60 on the frame 52 or the stringer 53 are disposed in a row along the $Y_2$ axial direction.

Subsequently, the control unit 11 calculates, based on the position coordinates of the plurality of keyholes 60 formed on the skin 51, an average position $x_{1avg}$ in the $X_1$ axial direction of the plurality of keyholes 60 disposed in a row on the skin 51 (step S13). The control unit 11 calculates, based on the position coordinates of the plurality of keyholes 60 formed on the frame 52 or the stringer 53, an average position $x_{2avg}$ in the $X_2$ axial direction of the plurality of keyholes 60 disposed in a row on the frame 52 or the stringer 53 (step S23).

The control unit 11 calculates a first imaginary line that passes the average position $x_{1avg}$ of the plurality of keyholes 60 formed on the skin 51 and is parallel to the $Y_1$ axial direction on the skin 51 (step S14). The control unit 11 calculates a second imaginary line that passes the average position $x_{2avg}$ of the plurality of keyholes 60 formed on the frame 52 or the stringer 53 and is parallel to the $Y_2$ axial direction on the frame 52 or the stringer 53 (step S24).

Thereafter, as shown in FIG. 4, the robot for attachment 3 attaches the frame 52 or the stringer 53 to the skin 51.

In that case, first, the robot for attachment 3 acquires, according to data taught by teaching or CAD data of the members, a position near a position where the frame 52 or the stringer 53 is attached to the skin 51. The robot for attachment 3 moves the frame 52 or the stringer 53 to the position near the attachment position of the member based on the acquired data while gripping the frame 52 or the stringer 53.

The keyholes 60 for positioning are formed on the skin 51, the frame 52, and the stringer 53. Since the frame 52 or the stringer 53 is a long member, a plurality of keyholes 60 are disposed in a row on the frame 52 or the stringer 53. The plurality of keyholes 60 are associated with the plurality of keyholes 60 disposed on the skin 51.

In this embodiment, the attachment position is determined by acquiring the first imaginary line on the skin 51 and the second imaginary line on the frame 52 or the stringer 53.

The positions of the keyholes 60 are different from positions designed in the members. Manufacturing errors occur in the keyholes 60. Therefore, when a reference line of the attachment position is set to pass the center of any one keyhole 60, positional deviation occurs because of a manufacturing error of the keyhole 60.

Therefore, in this embodiment, as shown in FIG. 6, the attachment position of the members is determined such that the first imaginary line on the skin 51 and the second imaginary line on the frame 52 or the stringer 53 calculated based on the plurality of keyholes 60 overlap (step S5).

The robot for attachment 3 moves, based on data concerning the determined attachment position, the frame 52 or the stringer 53 to the determined attachment position and superimposes the frame 52 or the stringer 53 on the skin 51 (step S6). The determined attachment position is based on the first imaginary line passing the average position in the $X_1$ axial direction of the keyholes 60 formed on the skin 51 and the second imaginary line passing the average position in the $X_2$ axial direction of the keyholes 60 formed on the frame 52 or the stringer 53. Therefore, when the frame 52 or the stringer 53 is superimposed on the skin 51, it is possible to minimize the influence of positional deviation due to manufacturing errors of the keyholes 60. Since an overlapping area of the keyholes 60 is the largest, a deficiency less easily occurs when rivets are inserted through the keyholes 60.

Subsequently, a robot for riveting (not shown in the figures) inserts rivets for temporary tacking through the keyholes 60 of the skin 51 and the frame 52 or the stringer 53 superimposed each other and fastens the skin 51 and the frame 52 or the stringer 53 with the rivets for temporary tacking (step S7). At this time, it is desirable to perform the riveting of the rivets for temporary tacking starting from the keyhole 60 present in a position where a positioning error of a hand attached to the distal end of an arm is small. If the keyhole 60 present in the position where the positioning error of the hand attached to the distal end of the arm is small is in an intermediate position in the $Y_1$ axial direction of the skin 51, since the intermediate position is a position where the rigidity of the skin 51 is high, the members are easily surely fastened. The keyhole 60 from which the riveting of the rivets for temporary tacking is started is present in the position where the positioning error of the hand attached to the distal end of the arm is small. Therefore, the rivets for temporary tacking riveted first can be riveted in an accurate position where an error is small.

In the method of performing the positioning of the members such as the skin 51, the frame 52, and the stringer 53 using the robot for detection 2 and the robot for attachment 3 explained above, after the keyholes 60 formed on the skin 51 and the keyholes 60 formed on the frame 52 or the stringer 53 are matched, the rivets for temporary tacking are riveted into the keyholes 60. At this time, since the frame 52 or the stringer 53 is the long member long in one direction, the plurality of keyholes 60 are disposed in a row and the plurality of keyholes 60 on the skin 51 are also disposed in a row. When the plurality of keyholes 60 are formed to be disposed in a row, since the plurality of keyholes 60 have manufacturing errors, it is difficult to accurately dispose the plurality of keyholes 60 on one straight line.

Therefore, there is a problem in that, when the skin 51 and the frame 52 or the stringer 53 are superimposed, the keyholes 60 formed on the skin 51 and the keyholes 60 formed on the frame 52 or the stringer 53 do not completely coincide. For that reason, when the skin 51 and the frame 52 or the stringer 53 are superimposed, it is desirable to position the members not to cause influence on the riveting as much as possible.

According to this embodiment, the attachment position of the members is based on the first imaginary line passing the average position in the $X_1$ axial direction of the plurality of keyholes 60 formed on the skin 51 and the second imaginary line passing the average position in the $X_2$ axial direction of the plurality of keyholes 60 formed on the frame 52 or the stringer 53. Therefore, when the frame 52 or the stringer 53 is superimposed on the skin 51, it is possible to minimize the influence of positional deviation due to manufacturing errors of the keyholes 60. Compared with when the frame 52 or the stringer 53 is attached to the skin 51 based on one keyhole 60 among the plurality of keyholes 60 disposed in a row, it is possible to accurately superimpose the skin 51 and the frame 52 or the stringer 53. Since the overlapping area of the keyholes 60 is the largest, a deficiency less easily occurs when rivets are inserted through the keyholes 60.

REFERENCE SIGNS LIST 1 aircraft component manufacturing system
2 robot for detection
3 robot for attachment
4 arm
5 camera
6 control unit 7 driving control unit
8 memory
9 arm
11 control unit
12 position calculating unit
13 average calculating unit
14 imaginary-line calculating unit
15 attachment-position determining unit
16 driving control unit
51 skin
52 frame
53 stringer

The invention claimed is:

1. A component manufacturing method comprising:
a first step of calculating, for a plurality of first positioning holes formed on a first member and disposed in a row along a first axial direction on the first member, a first imaginary line that is parallel to the first axial direction and that passes an average position in a second axial direction, wherein the second axial direction is perpendicular to the first axial direction;
a second step of calculating, for a plurality of second positioning holes formed on a second member different from the first member and disposed in a row along a third axial direction on the second member, a second imaginary line that is parallel to the third axial direction and that passes an average position in a fourth axial direction, wherein the fourth axial direction is perpendicular to the third axial direction; and
a third step of superimposing the first member and the second member such that the first imaginary line and the second imaginary line coincide.

2. The component manufacturing method according to claim 1, wherein
the first step includes:
a step of detecting positions of the plurality of first positioning holes;
a step of calculating, based on the detected positions of the plurality of first positioning holes, the average position in the second axial direction of the plurality of first positioning holes; and
a step of calculating the first imaginary line passing the average position of the first positioning holes, and
the second step includes:
a step of detecting positions of the plurality of second positioning holes;
a step of calculating, based on the detected positions of the plurality of second positioning holes, the average position in the fourth axial direction of the plurality of second positioning holes; and
a step of calculating the second imaginary line passing the average position of the second positioning holes.

3. A component manufacturing system comprising:
a robot for attachment that attaches a second member to a first member, wherein
the robot for attachment includes a control unit that controls the robot for attachment, and
the control unit includes:
an imaginary-line calculating unit that:
calculates, for a plurality of first positioning holes formed on the first member and disposed in a row along a first axial direction on the first member, a first imaginary line that is parallel to the first axial direction and that passes an average position in a second axial direction, wherein the second axial direction is perpendicular to the first axial direction, and
calculates, for a plurality of second positioning holes formed on a second member different from the first member and disposed in a row along a third axial direction on the second member, a second imaginary line that is parallel to the third axial direction and that passes an average position in a fourth axial direction, wherein the fourth axial direction is perpendicular to the third axial direction; and
a driving control unit that drives the robot for attachment and superimposes the first member and the second member such that the first imaginary line and the second imaginary line coincide.

4. The component manufacturing system according to claim 3, further comprising:
a robot for detection that detects positions of the plurality of first positioning holes and detects positions of the plurality of second positioning holes, wherein
the control unit of the robot for attachment further includes an average calculating unit that calculates, based on the detected positions of the plurality of first positioning holes, the average position in the second axial direction of the plurality of first positioning holes and calculates, based on the detected positions of the plurality of second positioning holes, the average position in the fourth axial direction of the plurality of second positioning holes.

* * * * *